United States Patent [19]

DeForest et al.

[11] Patent Number: 4,720,745
[45] Date of Patent: Jan. 19, 1988

[54] METHOD AND APPARATUS FOR ENHANCING VIDEO DISPLAYS

[75] Inventors: Sherman DeForest, Del Mar; S. Dale Seegmiller, Solana Beach, both of Calif.

[73] Assignee: DigiVision, Inc., San Diego, Calif.

[21] Appl. No.: 506,826

[22] Filed: Jun. 22, 1983

[51] Int. Cl.[4] .......................................... H04N 5/208
[52] U.S. Cl. ................................. 358/166; 358/283; 358/167; 358/37
[58] Field of Search ............... 358/140, 287, 166, 280, 358/283, 260, 160, 163, 137, 167, 37

[56] References Cited

U.S. PATENT DOCUMENTS

| | | | |
|---|---|---|---|
| 4,184,206 | 1/1980 | Harano | 358/283 X |
| 4,258,393 | 3/1981 | Ejiri et al. | 358/283 |
| 4,280,144 | 7/1981 | Bacon | 358/280 |
| 4,282,546 | 8/1981 | Reitmeier | 358/183 |
| 4,322,750 | 3/1982 | Lord et al. | 358/140 |
| 4,360,883 | 11/1982 | Ejiri et al. | 358/166 X |
| 4,437,122 | 3/1984 | Walsh et al. | 358/166 |
| 4,491,875 | 1/1985 | Kawamura | 358/283 X |
| 4,531,160 | 7/1985 | Ehn | 340/793 X |
| 4,547,812 | 10/1985 | Waller et al. | 358/283 |

FOREIGN PATENT DOCUMENTS 5384248 1/1980 Japan ...................... 358/160

OTHER PUBLICATIONS

D. R. Thompson, Digital Halftone Method for Matrix Displays, IBM Technical Disclosure Bulletin, Jun. 1977, pp. 235-238.

Primary Examiner—James J. Groody
Assistant Examiner—E. Anne Faris
Attorney, Agent, or Firm—Brown, Martin, Haller & Meador

[57] ABSTRACT

An NTSC composite color video signal is dematrixed and its RGB components are digitized so that each image or input frame is represented by a 512×512 pixel array. One high resolution output field is generated for each input frame by deriving a plurality of subpixel values for each input pixel. The subpixel values for a given pixel are derived by examining the nearest neighboring pixels and by utilizing enhancement algorithms represented by data in lookup tables. Signal to noise ratio improvement is achieved by comparing each given pixel value to the values of its neighboring pixels and then deciding whether or not to keep the given pixel value or to replace it with the median of it and its nearest neighbors. The subpixel values are fed through a digital to analog converter where the appropriate synchronization is added so that the analog outputs of the three branches of the device conform to the RS 343A format.

33 Claims, 7 Drawing Figures

METHOD AND APPARATUS FOR ENHANCING VIDEO DISPLAYS

BACKGROUND OF THE INVENTION

The present invention relates to video systems, and more particularly, to a method and apparatus for greatly enhancing the quality of video displays generated from conventional video signals.

Video images are generated on a CRT through the motion of its electron beam. This motion consists of scanning from left to right with a quick return to the left again, and from the top downward in subsequent lines. At the bottom of the image, the electron beam returns to the top left corner, and the process is repeated. Typically, successive fields are interlaced, i.e. the lines of the second scanning field fall between the lines of the first scanning field. This technique provides two picture images or fields for each frame and thereby greatly reduces flicker.

The number of scanning lines in the image is related to the resolving capability of the human eye and the viewing distance. It has been determined that if a pair of parallel lines is viewed at such a distance that the angle subtended by them at the eye is less than two minutes of arc, the eye sees them as one line. This fact is used to select the number of lines for a television system.

The NTSC standard followed in the United States provides 525 lines displayed at 30 frames per second, each frame consisting of two interlaced fields of 262.5 lines, the fields being displayed at 60 times a second. Each image is created from separate red, green and blue (RGB) images. An empirically derived matrix is used to convert these to luminance and chroma signals. Each chroma signal is delibertely bandwidth limited and modulated in quadrature on a 3.58 Megahertz subcarrier and superimposed on the corresponding luminance signal. This rather complex method of transmitting color video was defined in order to introduce color within the existing channel bandwidth in a manner which was compatible with the previously established monochrome standards.

Most video as seen in the home or professional environment does not exhibit the full 525 line resolution that is possible with the NTSC signal. A "good" home set will actually display about 300 lines. Only production broadcasters and other special purpose practitioners use "studio" quality monitors which can display the full 525 lines resolution. The projection video sets commonly sold for home use typically have even lower resolution, for example 220-240 lines.

It is necessary to distinguish between resolution and subjective image quality. As previously indicated, resolution depends upon the ability to distinguish between two lines placed close to each other. Better quality images as defined by observers, usually, but not always, will have higher resolution. The ability to increase the resolution of a given image using any kind of image processing is greatly limited, and often depends upon a prior knowledge of the scene content. However, great improvements in observer reported image quality can often be gained in other ways. In general, observers prefer images that are bigger and brighter. They will often rate images that have artificially enhanced edges of the objects in the scenes higher than the same images when accurately reproduced. This is well-known in the video art. Many of the best video cameras do not capture accurate reproductions of scenes, but rather introduce a halo around bright objects. This results in a more pleasing picture without increasing the resolution.

In many ways, video resolution correlates with the bandwidth needed to transmit the signal. Modern techniques can be employed to reduce the bandwidth needed for a given resolution. However, throughout the world the format and content of video signals are rigidly established. In part this is because transmission bandwidths are allocated and regulated by government agencies. Accordingly, if an improvement in the quality of video displays is to be achieved, it must be done within the constraints of the information available from conventional video signals. For example, it is impractical to suggest that resolution be improved by increasing the number of scanning lines per frame in the original video signal without government support.

Besides improving the resolution of images in a video display, it would also be desirable to improve the signal to noise ratio, sharpen the edges of objects in the displayed images, and enable color value manipulation.

Heretofore digital techniques have been utilized to perform image processing tasks to improve video displays. For example, still images transmitted back to earth from space probes have been processed on large computers to greatly improve signal to noise ratio and enhance certain aspects of the image. However, moving objects cannot be displayed in real time through this process as the computations required are extensive and time consuming.

A set of specialized circuit boards sold by Imaging Technology, Inc. of Woburn, Mass. under the designation IP-512 perform video signal processing to improve signal to noise ratio. This system is described in an article entitled "Video Signal Processing Improves SNR" by Robert Wang published in Electronic Imaging Magazine, March, 1983, pages 36-41. Because of speed limitations in the IP-512 system, the frame average and summation techniques disclosed in that article cannot currently be performed in real time on images of a moving object. The image compression and expansion techniques described in that article do not improve image resolution.

SUMMARY OF THE INVENTION

It is therefore the primary object of the present invention to provide a method and apparatus for enhancing in real time the quality of images produced from video signals.

Another object of the present invention is to provide a method and apparatus for significantly improving the resolution of images produced from video signals.

Another object of the present invention is to provide a method and apparatus for improving the signal to noise ratio of video signals.

Another object of the present invention is to provide a method and apparatus for real time sharpening of the edges of objects in images generated from video signals.

Another object of the present invention is to provide a method and apparatus for permitting real time color value manipulation with regard to images generated from video signals.

In the illustrated embodiment of the present invention an NTSC composite color video signal is dematrixed and its RGB components are digitized so that each image or input frame is represented by a 512×512 pixel array. One high resolution output field is generated for each input frame by deriving a plurality of subpixel values for each input pixel. The subpixel values for a given pixel are derived by examining the nearest neighboring pixels and by utilizing enhancement algorithms represented by data in lookup tables. Signal to noise ratio improvement is achieved by comparing each given pixel value to the values of its neighboring pixels and then deciding whether or not to keep the given pixel value or to replace it with the median of it and its nearest neighbors. The subpixel values are fed through a digital to analog converter where the appropriate synchronization is added so that the analog outputs of the three branches of the device conform to the RS 343A format.

BRIEF DESCRIPTION OF THE DRAWINGS

FIG. 7 illustrates a sequence of waveforms utilized as timing signals in the illustrated embodiment of applicants' apparatus.

DETAILED DESCRIPTION

The illustrated embodiment of the present invention which is described in detail hereafter is adapted for enhancing in real time the quality of images produced from an NTSC standard composite color video signal. The present invention could be utilized with other conventional video signal formats such as PAL and SECAM. The present invention may be utilized in conjunction with color or black and white video signals from a variety of sources such as broadcast, video tape, video disk or video camera. In addition, the present invention may be utilized with various types of video displays, such as CRT monitors or large screen display systems.

The present invention utilizes novel approaches for enhancing, in real time, the quality of images produced from conventional video signals. The term "real time" means, for example, that the present invention is able to "keep up with" an NTSC broadcast signal without loss of signal and concurrently exhibit live video programming in the same fashion as a conventional television set, while also providing greatly enhanced image quality. Applicants' invention is particularly suited to teleconferencing, military, and medical applications. In addition, applicants' method and apparatus may be used to generate large displays for theatrical, sporting, concert and promotional special events. Applicants' illustrated embodiment uses digital image processing to enhance the quality of the displayed image without placing any new requirements on the video signal standards or transmission of the signal.

The NTSC video signal is a time sequence of analog traces, each one representing the three-color RGB signal along a horizontal sweep line of the image. Digitizing the video signal many times along each horizontal sweep line generates a set of pixel values, each representing a small region of the image. Pixels are sometimes also called picture elements or pels. Digitizing an entire field in this manner produces a set of pixel values representing an array of small regions on the display which may be the face of a CRT or a screen. The bandwidth limitations imposed by the NTSC standard limit the amount of information, and thus the number of independent pixels during one horizontal sweep.

Figure 1:
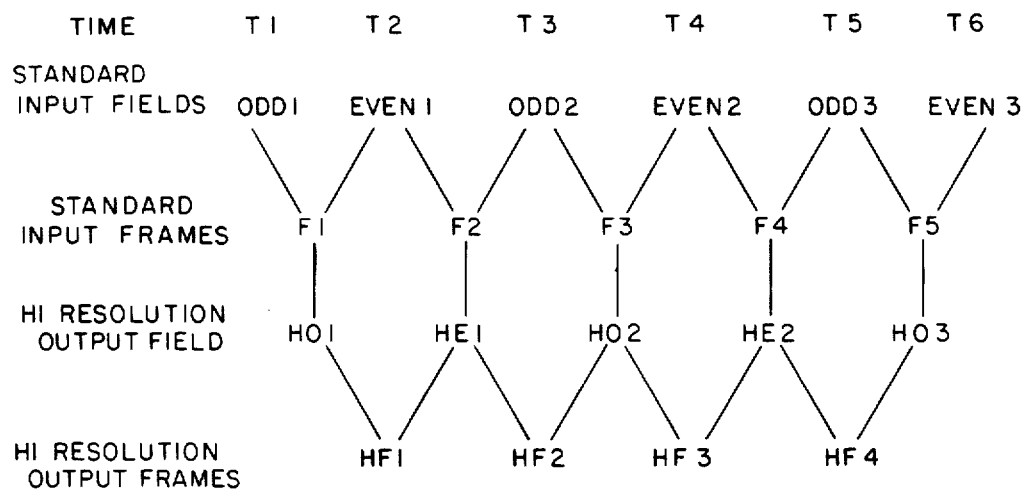
FIG. 1 is a schematic representation of the illustrated embodiment of applicants' method in which high resolution output frames each consisting of two interlaced high resolution output fields are generated from three successive input fields of an NTSC composite video signal.

The illustrated embodiment of applicants' method and apparatus may be utilized with a NTSC composite video signal from any of several sources, e.g. camera, broadcast, video tape or video disk. Referring to FIG. 1, the illustrated embodiment derives a single high resolution output field such as HO1 from a single input frame such as F1 which consists of two interlaced input fields such as ODD1 and EVEN1. Two high resolution output fields such as HO1 and HE1 are interlaced to produce a single high resolution output frame such as HF1. In FIG. 1, input frames such as F1 are each comprised of temporarily adjacent input fields. This is to be contrasted with the video art definition of a frame which implies that each frame is comprised of unique field data, i.e. under the conventional definition the frames in FIG. 1 would be F1, F3, F5 etc.

In FIG. 1, the time intervas T1, T2, T3, etc. are spaced 1/60th of a second apart. Each line of each input field is digitized into 512 pixels. There are 512 horizontal lines per input field. Each high resolution output frame such as HF1 has 1024 horizontal lines, each comprised of 1024 pixels. Where applicants' method and apparatus are to be used in conjunction with a CRT monitor, the monitor must be a special purpose color monitor having an RGB phosper pattern capable of displaying a $1024 \times 1024$ line picture. One such video monitor is the twenty-six inch CDCT-4366 high resolution color monitor manufactured by BARCO Video Systems, S. A. of Belgium.

Thus, the illustrated embodiment produces a display with significantly greater apparent image resolution than conventional video displays. Furthermore, each of the high resolution output frames consists of a pair of interlaced high resolution output fields so that the display does not flicker. In the illustrated embodiment of applicants' method and apparatus, each given pixel is converted into subpixels which represent subdivisions of the area represented by the given pixel. The values of the subpixels are determined by the value the given pixel and the values of predetermined ones of its adjacent neighbors. Besides increasing resolution, certain types of noise can be recognized and eliminated, or at least made less objectionable, through the same process.

In order to generate the high resolution video display, applicants' illustrated apparatus must be capable of processing the input fields from the NTSC signal at a very high rate of speed. High speed digital circuitry is utilized to digitize about ten megasamples per second. Furthermore, at least one NTSC input field must be stored in memory at all times. The processing required to generate each subpixel of each high resolution output field must be completed every twenty-five nanoseconds. Finally, the output subpixels must be converted to an analog signal having the appropriate format and synchronization for driving a conventional video display having an effective bandwidth of approximately forty megahertz.

Figure 2:
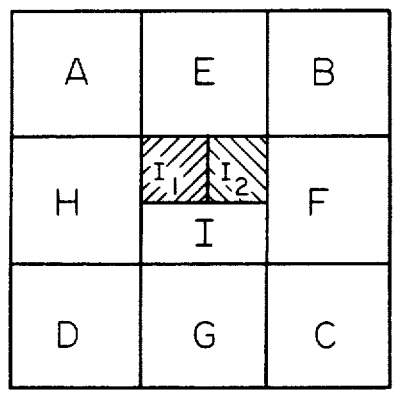
FIGS. 2 and 3 illustrate $3 \times 3$ pixel matrices from successive input frames and the manner in which subpixels are derived therefrom according to the illustrated embodiment of applicants' method.

It is necessary to store momentarily an input field because of the fact that each input frame is comprised of two interlaced input fields. In order to determine the subpixel values for a given pixel based upon the nearest neighboring pixels, the neighboring pixels must be present. However, the pixels in the horizontal lines above and below the line in which the given pixel is situated are separated in time by 1/60th of a second from the given pixel. FIG. 2 illustrates a 3×3 matrix of pixels A-I from an input frame. The values of the subpixels $I_1$-$I_2$, are functions of the values of the I pixel and the values of its neighboring EFGH pixels. The pixels A, E and B and the pixels D, G and C are from horizontal lines from one input field whereas the pixels H, I and F are from a horizontal line from the alternate input field. Therefore, in order to derive the values of the subpixels $I_1$-$I_2$, it is necessary to have the pixel values A-I from the three different lines of the corresponding input frame available at the same time.

Figure 3:
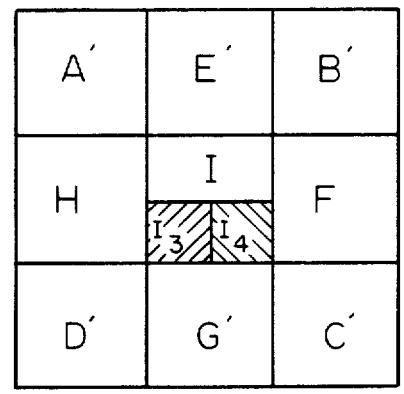

FIG. 3 illustrates a 3×3 matrix of pixels from the input frame following the input frames of FIG. 2. In FIG. 3, the center line containing the pixel I is interlaced between lines of a different input field than in FIG. 2. These lines contain the new pixel values A', E', B', D', G' and C'. The subpixels $I_1$, and $I_2$ (FIG. 2) are part of one high resolution output field such as HO1 (FIG. 1) and the subpixels $I_3$ and $I_4$ (FIG. 3) are part of the next high resolution output field such as HE1 (FIG. 1). HO1 and HE1 are interlaced so that the four subpixels $I_1$-$I_4$ are in adjacent quadrants.

The illustrated embodiment momentarily stores an entire input field and generates a high resolution output field when enough data from the succeeding input field is present. Specifically, the subpixel values for a given pixel are derived as soon as the 3×3 matrix of pixel values surrounding the given pixel value is available. In the illustrated embodiment, as the succeeding input field is being digitized, it overrides the preceeding stored input field in such a way that only data that has already been used to generate subpixel values is erased.

In the illustrated embodiment, subpixels $I_1$ and $I_2$ (FIG. 2) are generated from one input frame and subpixels $I_3$ and $I_4$ (FIG. 3) are generated from the next succeeding input frame. In this way, four times the number of output subpixels are generated as there are input pixels. Since NTSC pixels are generated at about one-hundred nanosecond intervals, this implies that on the average an output subpixel must be generated every twenty-five nanoseconds. Because of processing speed limitations of currently available digital integrated circuits, applicants' invention provides a means to "accelerate" the incoming data, as will be more fully described hereafter.

Figure 4:
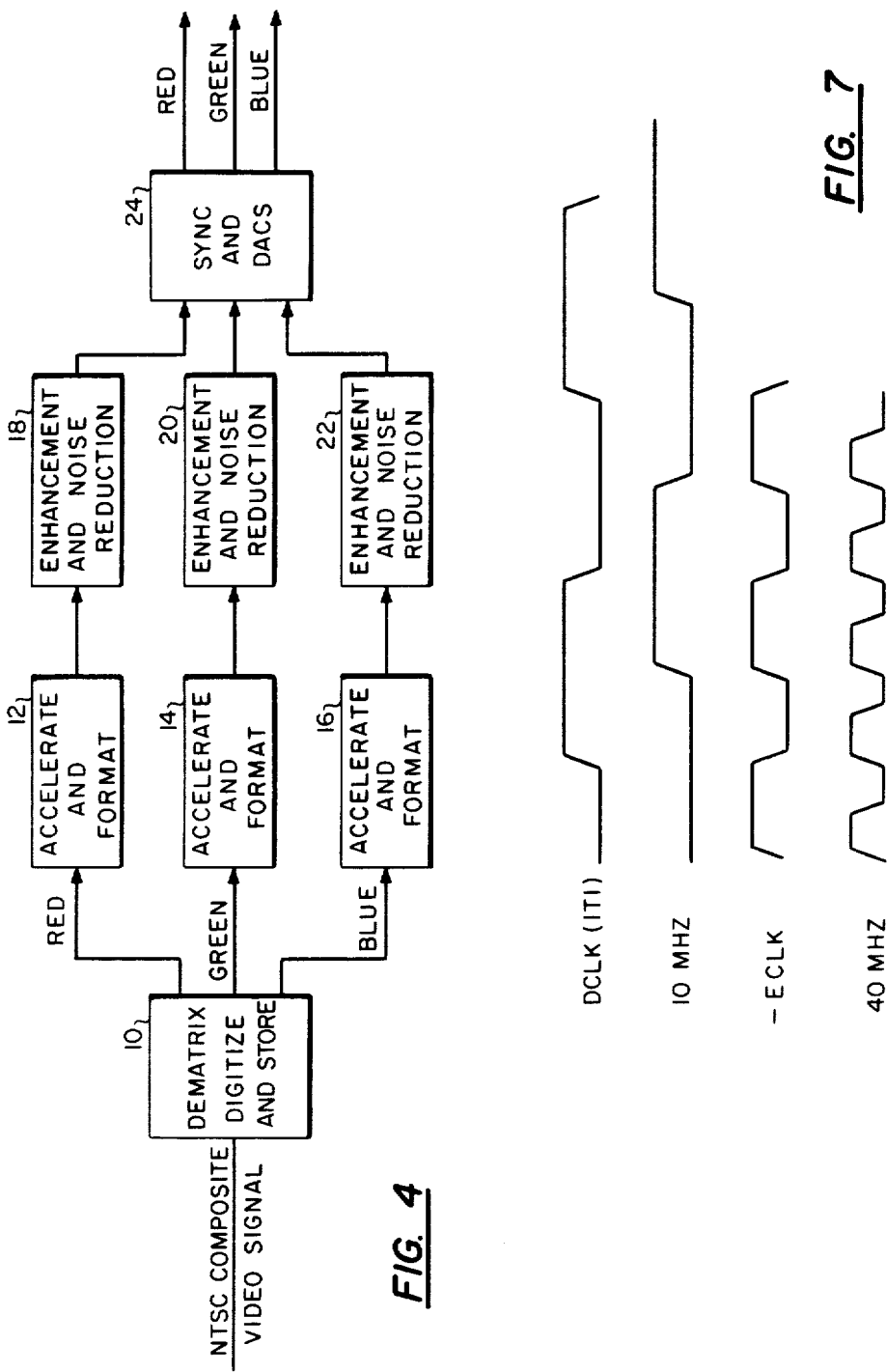
FIG. 4 is an overall functional block diagram of the illustrated embodiment of applicants' apparatus.

FIG. 4 illustrates an overall block diagram of an apparatus for implementing the illustrated embodiment of applicants' method. The incoming NTSC composite video signal is received by dematrix, digitize and store circuitry 10 which converts the analog, multiplexed video signal into three separate (RGB) digitized image streams and momentarily stores the digital representations for each RGB input field. In the illustrated embodiment, the three outputs of the dematrix, digitize and store circuitry are six bit representations of the intensity of red, green or blue for each pixel of a 512×512 matrix of each input frame. Thus, each pixel of each input field is represented by a total of eighteen bits which enables a quarter of a million possible different values of hue and intensity to be defined. In order to enhance the video display in real time, the apparatus is totally synchronous.

A complete input frame must be scanned in one-sixtieth of a second in order to produce one high resolution output field. Therefore, the illustrated embodiment includes an acceleration means for permitting input data to be scanned at twice the rate that it is arriving. NTSC pixels arrive at about one-hundred nanosecond intervals. Therefore, accelerate and format circuitry 12, 14 and 16 (FIG. 4) is provided for double buffering the incoming digital pixels for each red, green and blue stream in such a way that there is a new output value for each of these streams every fifty nanoseconds. Furthermore, the accelerate and format circuitry continuously looks at 3×3 pixel matrices for the red, green and blue portions of each input frame. Subpixel values are derived from each of these 3×3 matrices for the red, green and blue portions of each input frame by enhancer and noise reduction circuitry 18, 20 and 22.

The two subpixels outputted by the enhancement and noise reduction circuitry 18, 20 and 22 are fed to circuitry 24 where the red, green and blue digital signals are converted to analog form in individual DACs each fed by common sync signals. The red, green and blue outputs of the circuitry 24 meet the RS 343A standard required to drive a conventional raster-type video display.

The dematrix, digitize and store circuitry 10 in the illustrated embodiment consists of Model PCD 363 dematrix unit manufactured by LENCO, Inc. and Model IP-512 digitizing circuit boards manufactured by Imaging Technology, Inc. (ITC) of Woburn, Mass. The architecture and operation of the IP-512 circuit boards is described in greater detail in the article entitled "Video signal Processing Improves SNR" identified above. The IP-512 circuit boards include a frame buffer, analog processor and arithmetic logic unit which allows the user to perform a variety of image processing functions. In the illustrated embodiment, the arithmetic logic unit is not utilized. The NTSC composite video signal is dematrixed by the LENCO unit and the resulting red, green and blue composite signals are processed in the IP-512 circuit boards as follows. A sync stripper extracts the composite horizontal and vertical sync signal from the composite video signal. Once the IP-512 circuit boards are synchronized to the signal, timing and synchronization are internally generated. The input composite video signal also passes through conditioning circuitry before the analog signal for each color is digitized to eight bits through a TRW digitizer (Model TDC 1007). A lookup table (LUT) in the IP-512 boards is used to convert the eight bits to a six bit representation through a pseudologarithmic conversion. The digital representation of each RGE input field is momentarily stored in a memory.

Figure 5:
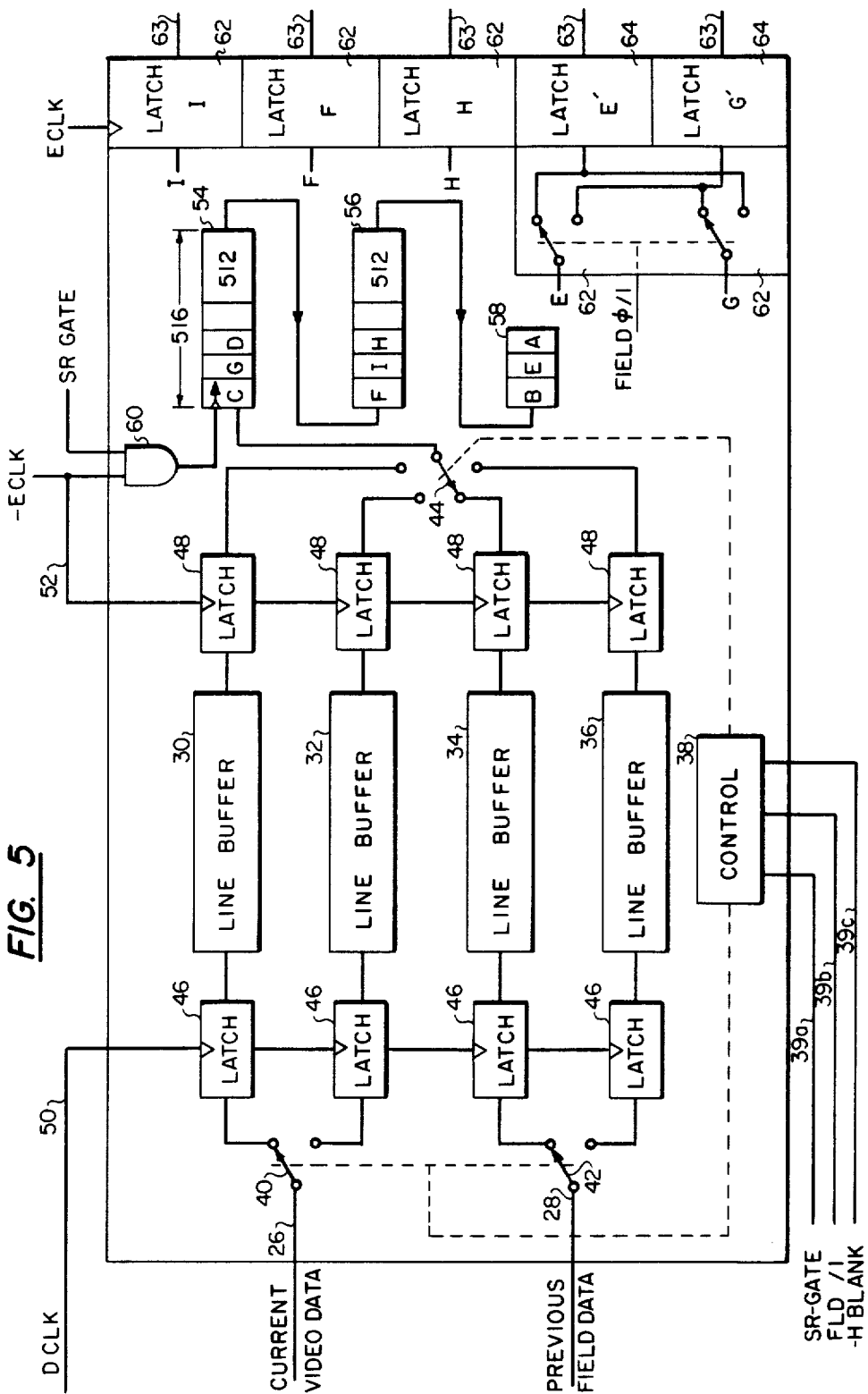
FIG. 5 is a block diagram illustrating the acceleration and format circuitry of the illustrated embodiment of applicants' apparatus which receives and processes one of the RGB digital streams from the dematrix and digitize circuitry of the apparatus.

FIG. 5 is a functional block diagram illustrating details of the acceleration and format circuitry 12 (FIG. 4) for the red portion of the image. It will be understood that similar circuitry processes the green and blue digital data from the dematrix, digitize and store circuitry 10. Digital data representing one input field is received on a current video data line 26, pixel by pixel and line by line. Digital data representing the previous input field which has been stored in the buffer of the corresponding IP-512 circuit boards is received on a previous field data line 28. A pair of line buffers 30 and 32 are alternately filled with data from the current video data line 26. A pair of line buffers 34 and 36 are alternately filled with data from the previous field data line 28. As the line buffers 30 and 34 are being filled, the line buffers 32 and and 36 are being filled, the line buffers 30 and 34 are being emptied. The buffers for the current video data line and the previous field data line are being filled at a rate of 10 megahertz and are being emptied at 20 megahertz. In effect, this results in acceleration of data which enables the apparatus to perform its image enhancing in real time.

A control device 38 in the form of a programmable array logic chip (PAL) performs the switching functions represented diagrammatically at 40, 42 and 44 to cause the line buffers 30, 32, 34 and 36 to be filled and emptied as previously described with the aid of input latches 46 and output latches 48. The inputs to the control device 38 on leads 39a, 39b, and 39c are labelled in FIG. 5. The signals for the leads 39b and 39c are from the IP-512 boards. The SR-GATE signal is generated by the control portion of circuitry 24 (FIG. 4) and fed back to the accelerate and format circuitry. The SR-GATE signal is used to synchronize control formatting of the data for inputting to the enhancer circuitry. The input latches 46 are driven by a 10 megahertz clock signal DCLK on line 50. See also FIG. 7. The output latches 48 (FIG. 5) are driven by a 20 megahertz clock signal −ECLK on lead 52. See also FIG. 7.

Data is emptied from the line buffers into three shift registers 54, 56 and 58 (FIG. 5). The shift registers 54 and 56 are 516 pixels in length. The shift register 58 is only 3 pixels in length. Data from the bottom of the shift register 54 is emptied into the top of the shift register 56 and data from the bottom of the shift register 56 is entered into the top of the shift register 58. The control device 38 empties data from the line buffers into the top of the shift register 54 and the shift registers are clocked to momentarily format 3×3 pixel matrices such as that illustrated in FIG. 2. The pixels A-I in FIG. 2 are labeled in FIG. 5. The shift registers are clocked by AND gate 60 whose inputs are the −ECLK and SR-GATE signals.

Figure 6:
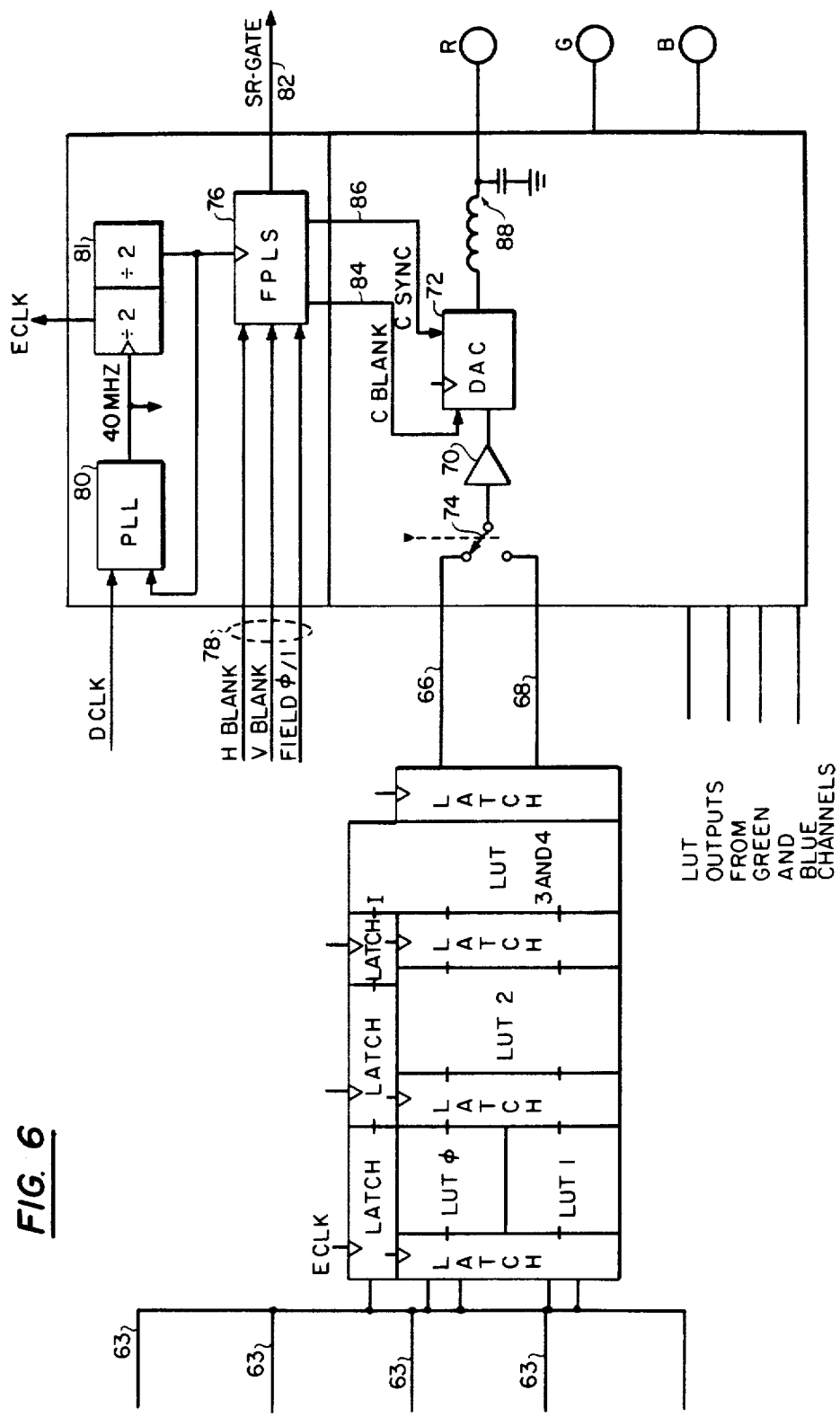
FIG. 6 is a block diagram of the enhancement and noise reduction circuitry for one color and the digital-to-analog/sync circuitry of the illustrated embodiment of applicants' apparatus.

Once each 3×3 pixel matrix is defined in the shift registers, such as the matrix of FIG. 2, selected ones of its six bit pixel values such as the values of the pixels I, F, H, E and G are loaded into corresponding latches 62 (FIG. 5). These pixel values are then used to address data in cascading fashion from lookup tables LUT0, LUT1, LUT2, LUT3 and LUT4 (FIG. 6) via leads 63 and latches associated with the lookup tables. This produces eight bit values for subpixels $I_1$ and $I_2$ on lines 66 and 68, respectively. When the 3×3 matrix of FIG. 3 is defined in the shift registers for the alternate output field, the E' and G' pixel values are loaded into corresponding latches 64 and the pixel values I, F, H, E' and G' are cascaded through the first through fourth lookup tables in FIG. 6 to produce eight bit values for subpixels $I_3$ and $I_4$ on lines 66 and 68, respectively.

This sequence of cascading lookup tables is utilized to perform the image enhancement processing while meeting the real time processing requirements of the system. The first through fourth lookup tables contain data representing enhancement algorithms which are empirically derived to achieve an enhanced image. For example, the enhancement could accomplish edge sharpening or color value manipulation.

Examples of suitable enhancement algorithms for deriving the subpixel values $I_1$–$I_4$ corresponding to the pixel values I are set forth hereafter:

$$I_1 = I + ((H-F) + (E-G))/8$$

$$I_2 = I + ((F-H) + (E-G))/8$$

$$I_3 = I + ((H-F) + (G'-E'))/8$$

$$I_4 = I + ((F-H) + (G'-E'))/8$$

It will be understood that greater enhancement may be achieved by determining subpixel values based upon a larger neighborhood surrounding a given pixel value. However, this would require much more extensive memory. The lookup tables may comprise RAM chips loaded by a host computer with values representing the enhancement algorithms. Alternatively, the lookup tables may comprise ROM chips. The enhancement algorithms may or may not employ linear operators.

Signal to noise ratio improvement may be accomplished prior to the enhancement processing by using the pixel values of each 3×3 matrix, e.g. the values A-I, to address lookup tables (not illustrated) for deriving a noise corrected value of I. Noise refers to any feature in the output image that was not intended to be there by the sender. A particularly common form of noise is single-pixel uncorrelated events. Applicants' apparatus can greately reduce or eliminate this type of noise by considering each pixel in the context of its neighbors and then deciding whether or not to keep the original value or to replace it with the median of it and its nearest two neighbors. Algorithms to accomplish this can be developed to define data for the lookup tables. Since the input pixels are scanned at twice the sampling rate, the decision on whether to keep a given pixel or derive a new value must be performed every fifty nanoseconds.

Calculation of median values may consume too much time within the very limited time available to preserve a real time system. Instead, a novel median filter technique can be utilized. The four most significant bits of three six bit pixel values can be entered as the addresses of a 4K×8 bit memory device. The output of this device (not illustrated) is the four most significant bits of the median and four commands bits which may be entered into another memory device along with the remaining bits from the input number. The output of the second memory device is the least two significant bits of the median. In this way, the calculation of the median is reduced to two lookup operations. The code carried by the command lines is an arbitrrary representation of the information that either the median value is identified, or that a particular candidate has been eliminated, or that no decision can be made based upon the four most significant bits.

The eight bit subpixel values, $I_1$ or $I_3$ on line 66 and $I_2$ or $I_4$ on line 68 are fed through a level translator device 70 in order to translate from CTL to TTL level before being fed into a DAC 72. Subpixels from lines 66 and 68 are alternately fed into the DAC at 40 magahertz as illustrated schematically by the switch 74.

A field programmable logic sequencer (FPLS) 76 (FIG. 6) accepts on lines 78 the H.BLANK, V.BLANK and FIELD 0/1 signals from the video bus from the IP-512 circuit boards. The DCLK 10 megahertz signal is inputted to a phase lock loop (PLL) device 80 which generates a 40 megahertz signal in quadrature. This signal is in turn divided by two by circuitry 81 to provide the 20 megahertz −ECLK signal which is in turn divided by two to provide a 10 megahertz signal. This latter signal is connected to the field programmable logic sequencer 76 and is fed back to the input of the phase lock loop device 80. The field programmable logic sequencer outputs the SR-GATE signal on line 82 which feeds back to the control 38 of the accelerate and format circuitry 12 (FIG. 5). This same SR-GATE signal also feeds back to the accelerate and format circuitry 14 and 16 (FIG. 4) for the other two colors. The field programmable logic sequencer also generates signals CBLANK and CSYNC which are connected to the DAC 72 via lines 84 and 86. These two signals, along with the 40 megahertz signal generated by the phase lock loop device are combined in the DAC 72 with the digital output of the enhancement and noise reduction circuitry to produce an analog rod signal through inductor capacitor combination 88 which meets the RS 343A format required to drive a conventional raster-type display. The same phase lock loop device 80 and field programmable logic sequencer 76 are also used to synchronize the DACs for the green and blue branches of the apparatus.

Having described an embodiment of our method and apparatus it should be apparent to those skilled in the art that our invention may be modified in arrangement and detail. For example, the enhancement and noise reduction methods may look at a much larger neighborhood of surrounding pixels. The system could be designed to operate with charge coupled devices. A high resolution output field could be derived from a single input field. A high resolution output field could be derived from a single input frame. The method and apparatus could be adapted to work with forms of video signals other than the standard NTSC, such as PAL and SECAM. In addition, the method and apparatus may be used with monochrome video signal formats. Accordingly, the protection afforded our invention should be limited only in accordance with the scope of the following claims.

We claim:

1. A method of enhancing the quality of a video signal, comprising the steps of:
   generating in real time from an input video signal having a first presentation bandwidth and including a succession of interlaced video fields a set of pixel values representing an image, each of said pixel values comprising a multi-bit digital value representing video signal intensity;
   deriving in real time a single set of subpixel values for each said pixel value according to a predetermined function, said function deriving each subpixel value solely from the values of a central pixel and a set of pixels surrounding said central pixel and contained in a video field which is interlaced with the video field containing the central pixel, and said function providing said subpixel values as multi-bit digital values; and
   converting in real time only the subpixel values obtained in said deriving step into an output signal corresponding to a video signal having a second presentation bandwidth higher than said first presentation bandwidth.

2. A method according to claim 1 wherein each pixel value generated for an image represents a portion of an area of said image.

3. A method according to claim 2 wherein each subpixel value derived for a given pixel value represents a portion of said area represented by said given pixel value.

4. A method according to claim 3 wherein the subpixel values for any given pixel value are generated as a function of the values of pixels representing areas adjacent to the area represented by the given pixel value.

5. A method according to claim 1 wherein the pixel values are generated by digitizing the video signal.

6. A method according to claim 5 wherein the subpixel values derived for any pixel value are derived through digital processing.

7. A method according to claim 6 further including the step of converting said output signal into an output analog signal having said second presentation bandwidth, 8. A method according to claim 1 wherein the pixel values of an entire image are stored before the subpixel values corresponding to that image are derived.

9. A method according to claim 1 wherein said input video signal provides successive odd and even interlaced input fields to generate successive input frames, and the subpixel values for an output field included in said output video signal are derived from the pixel values of a respective input frame, 10. A method according to claim 9 wherein the pixel values for each input field are momentarily stored and the subpixel values for its corresponding output field are generated as the pixel values for the succeeding input field are being generated and stored.

11. A method according to claim 1 wherein the video signal is a composite color video signal.

12. An apparatus for enhancing the quality of a video signal, comprising:
   means for generating in real time from an input video signal having a first presentation bandwith and including a succession of interlaced video fields a set of pixel values representing an image, each of said values representing video signal intensity;
   means for deriving in real time a single set of subpixel values for each said pixel value according to a predetermined function, said function deriving each subpixel value solely from the values of a central pixel and a set of pixels surrounding said central pixel and contained in a video field which is interlaced with the video field containing the central pixel, and said function providing said subpixel values as multi-bit digital values; and
   means for converting in real time only said subpixel values for said image into an output signal corresponding to a video signal having a second presentation bandwidth higher than said first presentation bandwidth.

13. An apparatus according to claim 12 wherein said input video signal is of the raster-type and said generating means defines each pixel value for said image so that it represents a portion of an area of said image.

14. An apparatus according to claim 13 wherein said deriving means defines each subpixel value so that it represents a portion of the area represented by the pixel value from which it is derived.

15. An apparatus according to claim 14 wherein said deriving means derives the subpixel values for any given pixel value as a function of the values of pixels representing areas adjacent to the area represented by said given pixel value.

16. An apparatus according to claim 12 wherein said generating means includes means for digitizing the video signal.

17. An apparatus according to claim 16 wherein said deriving means includes at least one lookup table having stored therein subpixel values addressed according to pixel values.

18. An apparatus according to claim 17 wherein said converting means includes at least one digital to analog converter for converting said subpixel values to analog form.

19. An apparatus according to claim 12 wherein said generating means includes means for storing pixel values corresponding to an entire image before the subpixel values corresponding to that image are derived.

20. An apparatus according to claim 16 wherein said deriving means includes:
means for accelerating the rate of the pixel values generated by said means for generating; and
means for momentarily defining a pixel matrix centered about each pixel in each set of pixel values.

21. An apparatus according to claim 12 wherein said input video signal provides successive odd and even interlaced input fields to generate successive input frames, and the deriving includes means for deriving subpixel values for an output field contained in said output video signal from the pixel values of a respective input frame.

22. An apparatus according to claim 21 wherein said generating means includes means for momentarily storing pixel values corresponding to each input field and said deriving means includes means for deriving the subpixel values for the corresponding output field as pixel values corresponding to the succeeding input field are being generated and stored.

23. A method of enhancing the quality of a video signal comprising the steps of;
generating, in real time from an input video signal having successive odd and even interlaced input fields to produce successive input frames, a set of pixel values representing an image;
storing a set of pixel values representing an input field;
deriving in real time a plurality of multi-bit subpixel values for each pixel value of an input frame generated from two successive interlaced input fields of said input video signal, one of said input fields including a stored input field; and
converting in real time said derived subpixel values into an output signal having the format and synchronization required to produce a single output field on a video display.

24. A method according to claim 23 wherein the pixel values for each input field are momentarily stored and the subpixel values for its corresponding output field derived as the pixel values for the succeeding input field are being generated and stored.

25. An apparatus for enhancing the quality of a video signal, comprising:
means for generating, in real time from an input video signal having successive odd and even interlaced input fields to produce successive input frames, a set of pixel values representing an image;
means for storing a set of pixel values representing an input field;
means for deriving in real time a plurality of multi-bit detail subpixel values for each pixel value of an input frame generated from two successive interlaced input fields of said input video signal, one of said input fields including a stored input field; and
means for converting in real time said derived subpixel values into an output signal having the format and synchronization required to produce a single output field on a video display.

26. An apparatus according to claim 25 wherein the generating means includes means for momentarily storing the pixel values for each input field and the deriving means includes means for deriving the subpixel values for the corresponding output field as the pixel values for the succeeding input field are being generated and stored.

27. A method of enhancing the quality of a video signal, comprising the steps of:
generating a sequence of pixels having a first rate from an input video signal which includes a succession of interlaced video fields, each of said pixels being expressed in the form of a multi-bit digital pixel value representing video signal intensity;
deriving a single set of subpixels for each of a predetermined group of pixels in said pixel sequence according to a predetermined function, said function deriving each subpixel value solely from the values of a central pixel and a set of pixels surrounding said central pixel and contained in a video field which is interlaced with the video field containing the central pixel, each of said subpixels being expressed in the form of a multi-bit digital subpixel value;
formatting the subpixels derived from said pixel sequence as an output subpixel sequence having an output rate higher than said first rate; and
providing said output subpixel sequence for display in analog video format.

28. A method according to claim 27 wherein said input video signal has a first video bandwidth and further including the step of converting said output pixel sequence into an output video signal having a second video bandwidth higher than said first video bandwidth.

29. A method according to claim 27 wherein said input and output video signals both provide successive odd and even interlaced video fields to generate successive video frames, and subpixels corresponding to a field in said output video signal are derived from pixels corresponding to two successive fields of said input video signal.

30. A method according to claim 29 wherein pixels for a video field of said input video signal are temporarily stored and subpixel values for a corresponding video field of said output video signal are derived as the pixels for the succeeding video field in said input video signal are being generated.

31. An apparatus for enhancing the quality of a video signal, comprising:
means for generating a sequence of pixels having a first rate from an input video signal and including a succession of interlaced video fields, each of said subpixels being expressed in the form of a multi-bit digital subpixel value;
means for deriving a single set of subpixels for each of a predetermined group of pixels in said pixel sequence according to a predetermined function, said function deriving each subpixel value solely from the values of a central pixel and a set of pixels surrounding said central pixel and contained in a video field which is interlaced with the video field containing the central pixel, each of said subpixels being expressed in the form of a multi-bit digital subpixel value;

means for formatting the subpixels derived from said pixel sequence into an output subpixel sequence having an output rate higher than said first rate; and means for providing said output subpixel sequence for display in analog video format.

32. An apparatus according to claim 31 wherein the input video signal includes a sequence of first video fields occurring at a first field rate, one of which includes a horizontal sequence of pixels, and said means for deriving include means for deriving subpixel values for a pixel in said sequence of pixels based upon pixels in a video field which precedes or succeeds said one video field.

33. An apparatus according to claim 32 wherein said subpixel values are based upon pixels adjacent said one pixel in said sequence of pixels and pixels in another sequence of pixels adjacent said one sequence of pixels, said other sequence of pixels being contained in a field which precedes or succeeds said one field.

* * * * *

UNITED STATES PATENT AND TRADEMARK OFFICE
CERTIFICATE OF CORRECTION

PATENT NO. : 4,720,745
DATED : January 19, 1988
INVENTOR(S) : DeForest et al.

It is certified that error appears in the above-identified patent and that said Letters Patent is hereby corrected as shown below:

Claim 25, column 12, line 2, delete "detail" and insert therefor --digital--

Signed and Sealed this

Fifth Day of July, 1988

*Attest:*

*Attesting Officer*

DONALD J. QUIGG

*Commissioner of Patents and Trademarks*